3,158,197
COOLING BY HEAT EXCHANGE WITH LIQUID FUEL IN AIRCRAFT
Leonard Blezard, Hayes, Middlesex, England, assignor to Hawker Siddeley Aviation Limited, Kingston-upon-Thames, England
Filed Aug. 31, 1961, Ser. No. 135,261
Claims priority, application Great Britain, Sept. 1, 1960, 30,196/60
7 Claims. (Cl. 165—40)

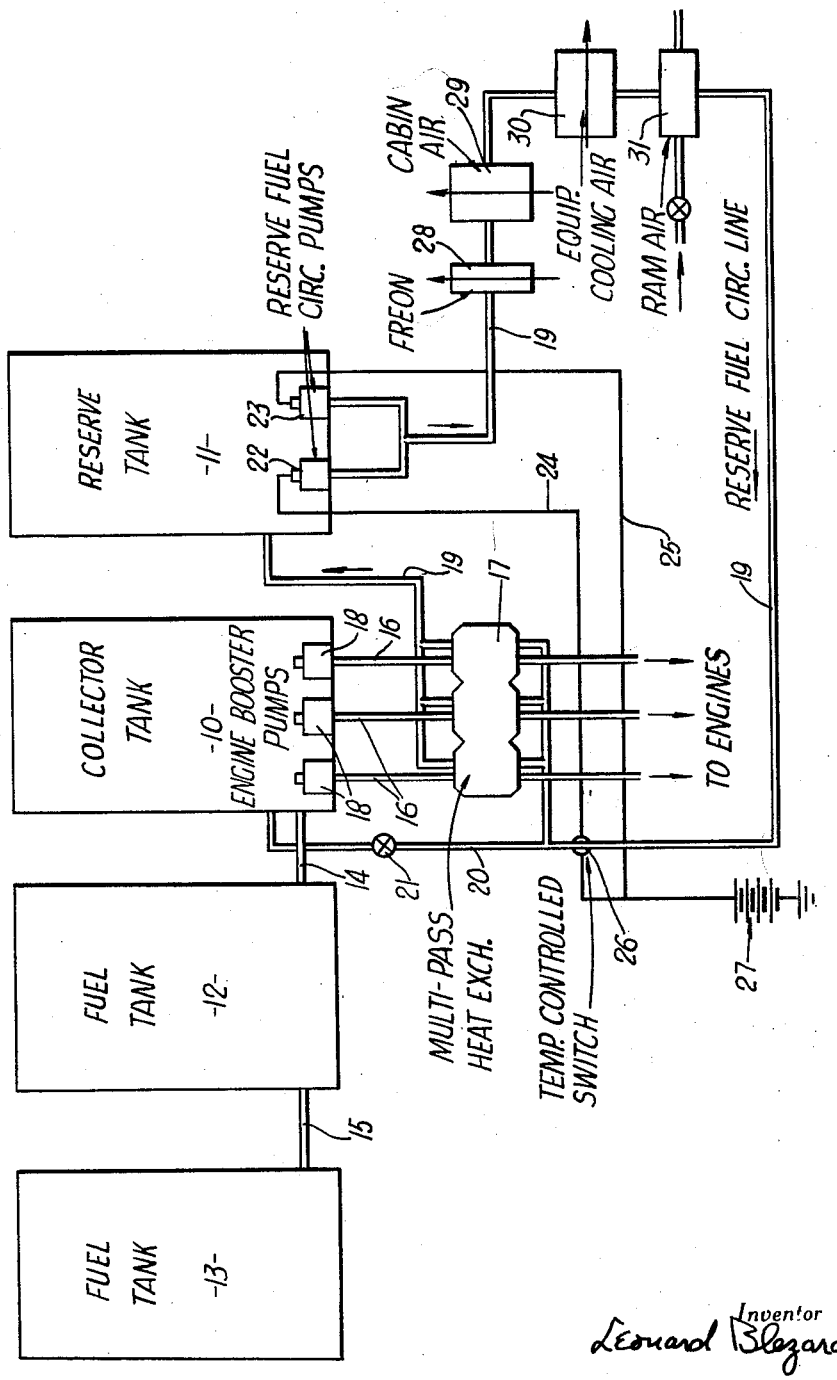

This invention relates to heat exchange systems for aircraft, and more especially to systems for cooling aircraft cabins and equipment.

When an aircraft is flying a high speed, and especially when an aircraft designed for supersonic flight is descending from altitude at a speed near its maximum, a great deal of surface heat is generated. The problem is to make provision for absorbing this heat without the temperature of the cabin and equipment being raised to an intolerable level. The use of a coolant, such as water, carried on the aircraft just for this purpose cannot be considered a satisfactory solution because the amount of coolant required would take up too much space and introduce a too severe weight penalty.

Since big modern aircraft have a very large fuel capacity it is an attractive idea to use the liquid fuel for the aircraft engines as a heat sink. However, difficulties arise in carrying this suggestion into practice. When the cooling system is likely to be most needed, that is when the aircraft is descending from altitude prior to landing, most of the fuel will have already been used up. Also, raising of the temperature of any of the fuel in the tanks to a dangerous degree must be avoided.

According to the present invention, there is provided a heat exchange system for aircraft wherein liquid fuel in at least one reserve fuel tank is circulated through heat exchangers and back to the reserve tank, there being at least one heat exchanger in which the circulating fuel abstracts heat from a fluid medium, for example air, used in keeping the aircraft cabin and/or aircraft equipment cool, and at least one other heat exchanger in which the circulating fuel loses heat to fuel being fed from another fuel tank or tanks to the aircraft engine or engines.

The reserve fuel tank or tanks will normally always be full during descent from high altitudes as a reserve of fuel must be kept for final manoeuvres, stand-off and so forth prior to touch-down. This reserve fuel would be incapable of absorbing all the heat without raising its temperature to a prohibitive degree, but the system according to the invention enables a considerable proportion of the heat gained by the circulating reserve fuel to be transferred to the main fuel feed to the engines where it is effectively disseminated. The temperature of the fuel in the service tanks, as distinct from the reserve tank or tanks, is not raised at all.

An important aspect of the system according to the invention is that the integrity of the fuel supply lines is preserved. That is to say the actual fuel supply to the engines is not encumbered by any circulatory cooling system and the fuel feed lines are direct with the pressure drop in them kept low. It is desirable to have as few heat exchangers and other apparatus in the actual fuel feed lines as possible and the present system can be achieved with just a single such heat exchanger. Other necessary heat exchange occurs in the reserve fuel circulating line which is separate from the direct engine fuel feed.

There will now be described, by way of example, one way of carrying the invention into practice, reference being had to the accompanying drawing which is a flow diagram of a heat exchange system for the cooling of the cabin of an aircraft and aircraft equipment.

In the system shown in the drawing liquid fuel for the aircraft engines is pumped from a collector tank 10 into fuel lines 16 by booster pumps 18. Any number of further fuel tanks, of which two tanks 12, 13 are shown, feed into the collector tank 10 through connections 14, 15. In addition to the tanks 10, 12 and 13, which are the service tanks, there is a reserve fuel tank 11 the fuel in which is not intended to be used at all in flight except in emergency or is to be used only during final manoeuvres immediately prior to landing. The reserve fuel in the tank 11 is continuously circulated through a closed circuit line 19 and back to the tank by one or both of the two reserve fuel circulating pumps 22, 23. To enable the reserve fuel to be used in the engines, if necessary, the circulating line 19 has a branch 20 leading to the collector tank 10 and controlled by a valve 21.

The reserve fuel circulating line 19 has connected into it in series a number of heat exchangers 28, 29, 30 and 31. In the heat exchanger 29 the circulating reserve fuel abstracts heat from the air of the aircraft cabin which is passed through the exchanger. In the heat exchanger 28 Freon is cooled by the circulating reserve fuel, the Freon also being used for cabin cooling. The heat exchanger 30 has further air passed through it for the purpose of cooling aircraft equipment.

The heat exchanger 31 is provided to abstract heat from the circulating reserve fuel warmed in the heat exchangers 28, 29, 30 as will hereinafter be explained. Principally, heat is abstracted from the circulating reserve fuel in a further multiple heat exchanger 17 which is connected into the fuel feed lines 16 from the collector tank 10. In the heat exchanger 17 the reserve fuel loses a large proportion of the heat gained in the exchangers 28, 29, 30 to the fuel that is on its way to the engines so that this heat is thereby effectively disseminated without increasing the temperature of the fuel in any way the fuel tanks. The reserve fuel tank 11 serves as a heat sink for any residual heat that has not been abstracted from the circulating reserve fuel by the time leaves the exchanger 17, and for this purpose the capacity of the normal reserve fuel tank is quite sufficient. With such an arrangement the temperature of the fuel in the reserve tank, if kerosene, can be kept at a maximum of, say 50° C. whilst the temperature of the fuel passing to the engines may be allowed to reach 100° C. A simple form of control allows automatic change in the amount of reserve fuel circulating in the line 19 in accordance with the temperature of that fuel. The reserve fuel circulating pumps 22, 23 are electrically controlled and one is energized continuously through a lead 25 from an electrical supply shown as a battery 27 while the other pump 22 is controlled by a lead 24 incorporating a temperature-sensitive switch 26 in the circulating line 19 upstream of the heat exchanger 17. Thus, the pump 23 will run all the time and the pump 22 will cut in and out depending on the temperature of the circulating reserve fuel. In general, only the pump 23 will run during take-off and climb, while both pumps will run during descent from altitude. Although the pumps are electrically-controlled the actual motive power may be hydraulic; for example, they may be driven by fuel supplied under pressure.

The purpose of the heat exchanger 31 is to enable the circulating reserve fuel to lose heat to ram and hence through the engines, particularly at low forward speeds. Ram air can be passed through the heat exchanger 31 at will by operation of a control valve. This is particularly useful for lowering the temperature of the fuel in the reserve tank 11 after the cooling system has been running at or near full capacity, that is to say after a descent from altitude and prior to the time when the full capacity of the cooling system will be required again.

It will be noted that the reserve fuel circulation is quite independent of the actual fuel feed to the engines. The fuel feed lines 16 are kept comparatively clean and free from circulatory complications, only the heat exchanger 17 being connected into them. This heat exchanger introduces into the fuel lines merely a small tolerable pressure drop.

The system shown in the drawing may be one half of the actual fuel heat exchange system provided on an aircraft, that is to say the tanks illustrated could be the port tanks, there being a similar set of tanks on the starboard side. In that case, the two reserve tanks may be coupled for the purpose of mixing their fuel contents so as to maintain the same temperature in each.

Modifications of the arrangement illustrated are, of course, possible without departing from the scope of the invention. Thus, the arrangment of heat exchangers 28, 29, 30 and 31 is given merely by way of example and can be varied as desired. Heat exchangers can be connected into the circulating line 19 in parallel, instead of in series, if that better suits the circumstances aboard a particular aircraft.

It will be noted that, since the circulating reserve fuel returns to the same tank as that from which it is drawn, the centre of gravity of the aircraft is in no way affected by the extent to which the heat exchange system is used.

I claim:

1. In an aircraft having liquid-fuel-burning engines for propulsion, a system comprising a first fuel tank, a fuel-to-fuel first heat exchanger having a first inlet and outlet for a main fuel feed flow and a second inlet and outlet for reserve fuel flow, main fuel feed lines connecting said first fuel tank to said first inlet of said first heat exchanger and connecting said first outlet of said first heat exchanger to said engines, a reserve second fuel tank, a second heat exchanger having a first inlet and outlet for reserve fuel and a second inlet and outlet for cooling fluid flow, a reserve fuel circulating line connecting said second fuel tank and said first inlet of said second heat exchanger, connecting said first outlet of said second heat exchanger and said second inlet of said first heat exchanger, and connecting said second outlet of said first heat exchanger and said second fuel tank, main feed pump means for delivering fuel from said first fuel tank through said main fuel feed lines and said first head exchanger to said engines, reserve fuel circulating pump means for circulating fuel from said second tank through said reserve fuel circulating line and said second and first heat exchangers and back to said second tank, and cooling fluid conduit means delivering aircraft cooling fluid through said second heat exchanger by way of said second inlet and outlet thereof, whereby the circulating reserve fuel is passed in turn into heat exchange relationship with said cooling fluid in said second heat exchanger and with the fuel supply to said engines in said first heat exchanger.

2. A system as claimed in claim 1, and comprising temperature-sensitive control means for automatically increasing the circulation flow of reserve fuel when the temperature thereof increases and reducing it when the temperature drops.

3. A system as claimed in claim 1, wherein only a single heat exchanger, for abstracting heat from the circulating reserve fuel, is connected into the fuel feed lines to the engines.

4. A system as claimed in claim 1, wherein at least one heat exchanger through which the reserve fuel circulates is arranged for abstracting heat from aircraft cabin air.

5. A system as claimed in claim 2, wherein the temperature-sensitive control means comprises a control arrangement, for the reserve fuel circulating pump means, that includes a temperature-sensing component associated with the reserve fuel circulating line at a position upstream of the fuel-to-fuel heat exchanger.

6. A system as claimed in claim 1, wherein there is connected into the reserve fuel circulating line a heat exchanger in which the circulating reserve fuel loses heat to ram air passing to the engines.

7. A method of cooling an aircraft cabin comprising pumping fuel from a main fuel supply source to engine fuel feed means, simultaneously circulating fuel from a reserve fuel supply source first into heat exchange relationship with air drawn from the aircraft cabin, then into heat exchange relationship with the fuel being pumped from the first supply source to the fuel feed means, and then back to the second supply source, and returning to the cabin the air that has been in heat exchange relationship with the circulating reserve fuel.

References Cited in the file of this patent
UNITED STATES PATENTS
2,353,966     Newcombe _____ July 18, 1944
FOREIGN PATENTS
629,298     Great Britain _____ Sept. 16, 1949